United States Patent
Myers et al.

(10) Patent No.: US 7,314,198 B2
(45) Date of Patent: Jan. 1, 2008

(54) AIRCRAFT EVACUATION SLIDE WITH THERMALLY ACTUATED GAS RELIEF VALVE

(75) Inventors: Kevin Myers, Phoenix, AZ (US);
Andrew Clegg, Phoenix, AZ (US);
Peter P. Seabase, Cuyahoga Falls, OH (US)

(73) Assignee: Goodrich Corporation, Charlotte, NC (US)

( * ) Notice: Subject to any disclaimer, the term of this patent is extended or adjusted under 35 U.S.C. 154(b) by 21 days.

(21) Appl. No.: 11/351,779

(22) Filed: Feb. 10, 2006

(65) Prior Publication Data

US 2007/0187551 A1    Aug. 16, 2007

(51) Int. Cl.
*B64C 1/22* (2006.01)
(52) U.S. Cl. .................... 244/905; 244/137.2
(58) Field of Classification Search ........... 244/905, 244/137.2; 169/90, 37
See application file for complete search history.

(56) References Cited

U.S. PATENT DOCUMENTS

| | | | | |
|---|---|---|---|---|
| 3,698,483 A * | 10/1972 | Martin et al. ............ | 169/37 |
| 4,368,009 A * | 1/1983 | Heimovics et al. ......... | 417/191 |
| 6,240,951 B1 * | 6/2001 | Yori ............................ | 137/224 |
| 6,659,404 B1 * | 12/2003 | Roemke .................. | 244/137.2 |
| 6,877,698 B2 * | 4/2005 | Baker et al. ................. | 182/48 |
| 2007/0023578 A1 * | 2/2007 | Myers et al. ............ | 244/137.2 |
| 2007/0045473 A1 * | 3/2007 | Clegg et al. ............. | 244/137.2 |

* cited by examiner

*Primary Examiner*—James S. Bergin
*Assistant Examiner*—Benjamin P Lee
(74) *Attorney, Agent, or Firm*—Jerry J. Holden; John D. Titus

(57) ABSTRACT

An inflation valve for use with an inflatable emergency evacuation slide includes a thermally actuated gas relief valve having an exhaust port the effective size of which increases with increasing temperature. The exhaust port is metered by a valve member. The valve member position is controlled by a thermal actuator that lengthens with increasing temperature. At high ambient temperatures, the valve member moves to uncover the exhaust port thereby increasing the effective size of the port so that a large percentage of the inflation gas is vented. At low ambient temperatures the valve member moves to cover the exhaust port, thereby decreasing effective size of the exhaust port so that little or no inflation gas is vented.

6 Claims, 3 Drawing Sheets

AIRCRAFT EVACUATION SLIDE WITH THERMALLY ACTUATED GAS RELIEF VALVE

BACKGROUND OF THE INVENTION

This invention relates to emergency evacuation equipment for aircraft, in particular to an inflation device for inflating an inflatable aircraft evacuation slide or other inflatable device. The requirement for reliably evacuating airline passengers in the event of an emergency is well known. Emergencies at take-off and landing often demand swift removal of passengers from the aircraft because of the potential for injuries from fire, explosion, or sinking in water. A conventional method of quickly evacuating a large number of passengers from an aircraft is to provide multiple emergency exits, each of which is equipped with an inflatable evacuation slide. Current state of the art emergency evacuation slide systems comprise an inflatable evacuation slide that is stored in a folded, uninflated state together with a source of inflation gas. The source of inflation gas typically comprises a gas generator, stored compressed gas, or a combination thereof. Pyrotechnic gas generators have an advantage in that they are small, lightweight, and produce a high volume of gas, however, the high temperature gas produced by a gas generator alone can cause numerous problems including sagging of the evacuation slide as the inflation gas cools and, in some cases melting or scorching of the fabric out of which the inflation slide is fabricated.

Use of stored compressed gas by itself, although simple, implicates a weight penalty that must be paid for carrying a pressure vessel having sufficient capacity (in terms of volume and pressure) to inflate the evacuation slide over the wide operational temperature range specified for such slides. Additionally, where only a compressed gas is used to inflate the evacuation slide, a large drop in temperature occurs as the gases expand, often causing ice to form, which can block the flow of gas. Accordingly, state of the art emergency evacuation slide systems typically comprise a hybrid inflator, which utilizes a stored compressed gas together with a pyrotechnic gas generator. The pyrotechnic gas generator augments the stored compressed gas by providing additional gas as well as heat to counteract effects of the expansion-induced cooling of the compressed gas as it expands out of the pressure vessel.

To further augment the volume of gas delivered to the evacuation slide, many evacuation systems utilize aspirators such as that disclosed in U.S. Pat. No. 4,368,009 to Heimovics, et al. As the compressed gas flows through the aspirator, a venturi draws additional air into the aspirator to pump about two to three times as much gas into the evacuation slide as is supplied by the gas source alone.

Despite these advances, there still exists problems due to the wide ambient temperature range over which these inflation systems are required to operate, typically from −65° F. to +160° F. The amount of gas available must be enough to pressurize the evacuation slide at the coldest temperature. Because of the relationship between pressure and temperature within a fixed volume, however, as the ambient temperature rises above the minimum, the pressure within the pressure vessel rises proportionately. Accordingly, at higher temperatures, the inflation system produces substantially more gas than is necessary to inflate the evacuation slide. To prevent overpressurization and possible rupturing of the inflatable evacuation slide, provisions must be made to vent the excess inflation gas.

A conventional method of venting the excess inflation gas is to provide several pressure relief valves in the inflatable slide itself. Pressure relief valves, however, add significant weight to the inflatable evacuation slide and add substantial volume to the inflatable slide in its uninflated, stored condition. According to U.S. Pat. No. 6,240,951 to Yori and assigned to the assignee of the present invention, excess inflation gas may be vented by means of a regulator valve that includes an active waste gate, which vents excess gas as the pressure in the outlet port of the regulator valve rises. Although the valve of Yori accomplishes the function of venting excess inflation gas it does so at the cost of substantial complexity and cost.

Accordingly, what is needed is a simple and inexpensive control valve for an aircraft emergency evacuation slide that reliably vents excess inflation gas thereby eliminating or reducing the number of pressure relief valves required in the slide itself.

SUMMARY OF THE INVENTION

The present invention comprises a control valve that includes a thermally actuated gas relief valve having an exhaust port the effective size of which increases with increasing temperature. According to an embodiment of the invention, the control valve comprises an inlet port in fluid communication with the pressure vessel containing the stored inflation gas, a primary valve member closing the inlet port, a primary outlet port in fluid communication with the inflatable evacuation slide and a chamber leading from the inlet port to the primary outlet port. The thermally actuated gas relief valve is in fluid communication with the chamber leading from the primary valve member to the primary outlet port.

In operation, in the event of an aircraft emergency exit door being opened in the "armed" condition, the primary valve member is opened allowing inflation gas to flow into the chamber. Depending on the ambient temperature conditions, a portion of the gas entering the chamber is vented through the thermally actuated gas relief valve. At high ambient temperatures, the effective size of the exhaust port of the thermally actuated gas relief valve is large and a large percentage of the inflation gas is vented. At low ambient temperatures the effective size of the exhaust port of the thermally actuated gas relief valve is small or closed and, therefore, little or no inflation gas is vented through the thermally actuated gas relief valve. Because ambient temperature is an effective proxy for gas pressure within a closed container, the thermally actuated gas relief valve exhausts excess pressure when there is excess inflation gas in the system without exhausting inflation gas at colder temperatures which would result in an under-inflation condition.

BRIEF DESCRIPTION OF THE DRAWING

The present invention will be better understood from a reading of the following detailed description, taken in conjunction with the accompanying drawing figures in which like references designate like elements and, in which.

DETAILED DESCRIPTION

Figure 1:
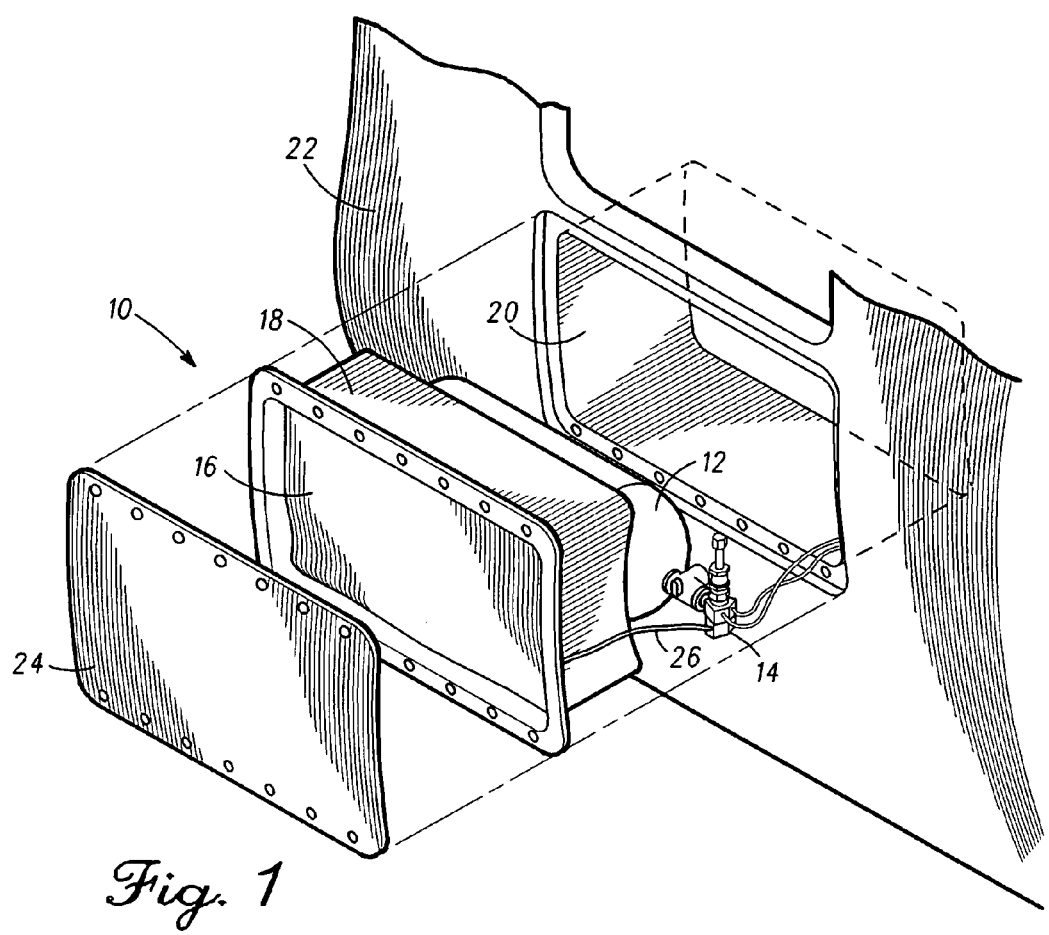
FIG. 1 is an exploded perspective view showing an inflation system incorporating features of the present invention.

The drawing figures are intended to illustrate the general manner of construction and are not necessarily to scale. In the detailed description and the drawing figures, specific illustrative examples are shown and herein described in detail. It should be understood, however, that the drawing figures and detailed description are not intended to limit the invention to the particular form disclosed, but are merely illustrative and intended to teach one of ordinary skill how to make and/or use the invention claimed herein and for setting forth the best mode for carrying out the invention.

With reference to FIG. 1, an inflatable aircraft evacuation slide system 10 incorporating features of the present invention comprises a pressure vessel 12 containing pressurized inflation gas, a control valve 14 and an inflatable evacuation slide 16 stored in an uninflated condition within in a packboard compartment 18. Packboard compartment 18 is secured within a recess 20 in the outer hull of aircraft 22 and covered by a cover panel 24. Pressure vessel 12 further includes a pyrotechnic gas generator (not shown) that heats and augments the stored inflation gas within pressure vessel 12. In normal operation, the opening of the aircraft emergency evacuation exit door in the armed condition causes a signal to be sent to control valve 14 causing control valve 14 to open allowing inflation gas to flow from pressure vessel 12 into inflation line 26 to operate the locks allowing cover panel 24 to fall away and to inflate inflatable evacuation slide 16. Simultaneously, the gas generator is initiated to augment and heat the stored inflation gas flowing out of pressure vessel 12. As noted hereinbefore, when evacuation slide system 10 is initiated at an elevated temperature, substantial excess inflation gas is produced due to the combined thermal effects of the ambient temperature and the pyrotechnic gas generator. Accordingly, in addition to functioning as the primary valve between the source of inflation gas and the inflatable evacuation slide, control valve 14 further acts to vent the appropriate portion of the excess inflation gas as more fully described hereinafter.

Figure 2:
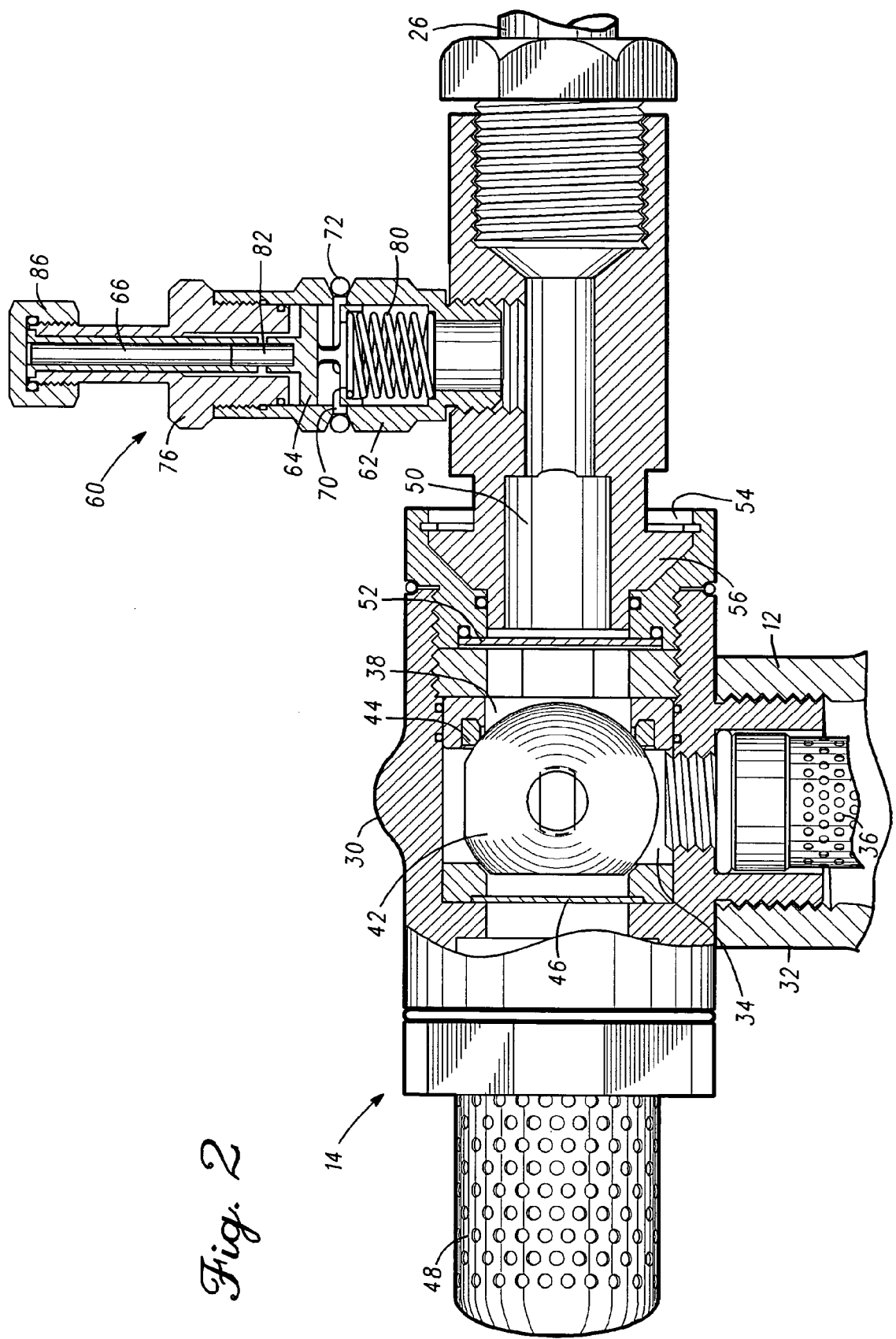
FIG. 2 is a cross-sectional view of a control valve for use in the evacuation slide system of FIG. 1.

With reference to FIG. 2, control valve 14 comprises a valve body 30 attached to the outlet 32 of pressure vessel 12. Valve body 30 includes a first chamber 34 that is in fluid communication with vessel 12 via an inlet filter 36. First chamber 34 is sealed from a second chamber 38 by means of a primary valve 40 composed of a ball member 42 that is seated against a valve seat 44. First chamber 34 has an overpressure exhaust vent that is sealed by means of an overpressure burst disk 46. Overpressure burst disk 46 ruptures in the event pressure in first chamber 34 exceeds a predetermined safe pressure and vents the overpressure to the atmosphere through a neutral thrust diffuser 48. Second chamber 38 is separated from a third chamber 50 by means of a secondary valve member which in the illustrative embodiment comprises a burst disk 52.

Figure 3:
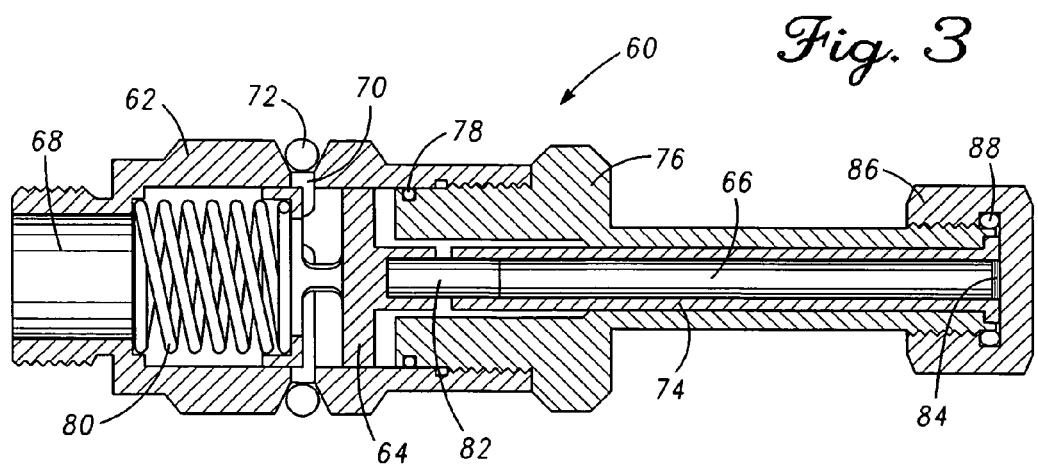
FIG. 3 is a cross-sectional view of the thermally actuated valve portion of the control valve of FIG. 2.
Figure 4:
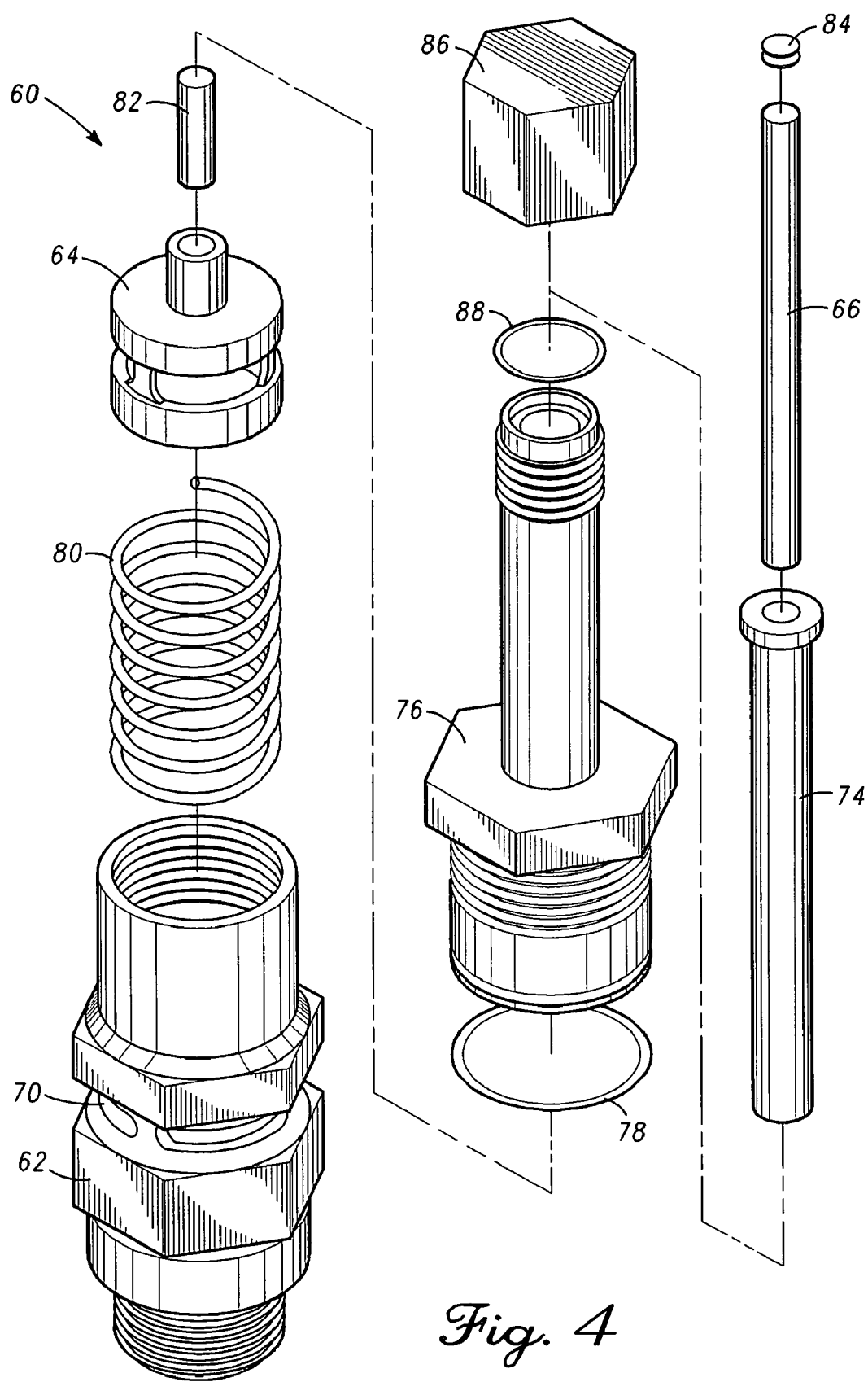
FIG. 4. is an exploded view of the thermally actuated valve of FIG. 3

With additional reference to FIGS. 3 and 4, control valve 14 further comprises a thermally actuated gas relief valve assembly 60 that is attached to an outlet fitting 56. Outlet fitting 56, in turn, is attached to the outlet port 54 of vale body 30. Thermally actuated gas relief valve 60 comprises a housing 62, a valve member 64 and a thermal actuator 66. Housing 62 has an inlet port 68 in fluid communication with chamber 50 and an exhaust port 70 that depending on the position of valve member 64, is fully obstructed, partially obstructed, or unobstructed by valve member 64. A burp seal 72, typically a conventional O-ring, prevents dirt and moisture from entering exhaust port 70 while providing little or no resistance to gas flowing out through exhaust port 70. Thermal actuator 66 is positioned within a sleeve 74, which is held within a cylinder housing 76. Cylinder housing 76, in turn, is threaded into housing 62 with an O-ring seal 78. A spring 80, biases valve member 64 toward the fully closed position. The spring bias is resisted by thermal actuator 66 which presses on a piston 82 that rides in the bore of sleeve 74. The precise location of valve member 64 is adjusted during assembly by insertion of an appropriate number of shims 84, which are sandwiched between the end of thermal actuator 66 and a cap 86 that is threaded onto cylinder housing 76. Cap 86 is sealed with a conventional O-ring seal 78.

Thermal actuator 66 is formed of a material having a high thermal coefficient of expansion, preferably from 0.0001-0.001 inch/inch degree Fahrenheit, more preferably from 0.0002-0.0004 inch/inch degree Fahrenheit and most preferably about 0.0003 inch/inch degree Fahrenheit. In the illustrative embodiment, the thermal actuator 66 is a solid cylinder of silicone rubber 150GS124 available from Smithers Scientific Services, Inc. of Akron, Ohio. Silicone rubber 150GS124 has a thermal coefficient of expansion of 0.00028 inch/inch degree Fahrenheit. In the illustrative embodiment, the thermal actuator is 2.5 inches long and, therefore, over a temperature range of −65° F. to +160° F. the thermal actuator is capable of moving the valve member 0.160 inches from a fully closed position to a fully opened position.

In normal operation, when the aircraft emergency evacuation exit is opened in the armed condition an electroexplosive device (not shown) opens primary valve 40 by rotating ball member 42 off its seat 44, allowing pressure to flow from first chamber 34 into second chamber 38. Rising pressure in second chamber 38 causes burst disk 52 to rupture allowing inflation gas to flow from second chamber 38 into third chamber 50. The majority of the inflation gas enters inflation line 26 to immediately operate the locks to release cover panel 24 and begin inflation of inflatable evacuation slide 16, however, depending on the position of valve member 64 a portion of the inflation gas is vented through exhaust port. In high ambient temperature conditions (i.e., +160° F.) thermal actuator 66 has expanded to its maximum length of 2.55 inches which leaves exhaust port 70 of thermally actuated gas relief valve assembly 60 in its fully unobstructed condition. This allows the maximum portion of inflation gases entering chamber 50 to be vented. Because at high ambient temperature conditions, substantially more than enough inflation gas is available to fill the emergency evacuation slide, maximum venting conditions enable the slide to be fully inflated without rupturing. Conversely, in cold temperature conditions (i.e., −65° F.) thermal actuator 66 has decreased in length by 0.160 inches and, therefore, no inflation gas is exhausted through exhaust port 70. Accordingly, 100% of the inflation gas generated at −65° F. is directed into the inflatable emergency evacuation slide to ensure the slide is fully inflated at the cold temperature condition. Since thermal actuator 66 is essentially an analog device that expands linearly with respect to temperature, at any given ambient temperature between −65° F. and +160° F. thermal actuator 66 will extend to a length that is proportional to the temperature difference between −65° F. and +160° F. In doing so, a linearly proportional volume of gas is exhausted through exhaust port 70 resulting in the ideal volume of gas being directed into the emergency evacuation slide for the given ambient conditions.

Although certain illustrative embodiments and methods have been disclosed herein, it will be apparent from the foregoing disclosure to those skilled in the art that variations and modifications of such embodiments and methods may be made without departing from the spirit and scope of the invention. For example, although in the illustrative embodiment control valve 14 comprises valve body 30, fitting 56 and housing 62, a unitary valve body incorporating the primary valve and gas relief valve functions is considered within the scope of the present invention. Similarly, although the evacuation slide system 10 shown in the illustrative embodiment is an over-wing slide, the inflation system of the present invention is equally applicable to door exit slides as well as other applications in which the volume of gas needs to be varied with temperature such as rafts, pontoons and the like. Accordingly, it is intended that the invention should be limited only to extent required by the appended claims and the rules and principals of applicable law.

What is claimed is:

1. An inflatable aircraft evacuation slide system comprising:
    an inflatable evacuation slide stored in an undeployed condition;
    a source of inflation gas for inflating said inflatable evacuation slide;
    a control valve, said control valve comprising;
        a valve body defining an interior chamber and an inlet port in fluid communication with said source of inflation gas,
        a primary valve member, said primary valve member disposed in a gas flow path between said inlet port and said interior chamber, said primary valve member opening in response to an external signal to permit pressurized fluid to flow from said inlet port into said interior chamber,
        a primary outlet port having a first end opening into said interior chamber and a second end in fluid communication with said inflatable evacuation slide defining a gas flow path from said interior chamber to said inflatable evacuation slide, and
        a gas relief valve in fluid communication with said a gas flow path between said interior chamber of said control valve and said inflatable evacuation slide, said gas relief valve having a vent port opening into a region external to said valve body, said gas relief valve further comprising a valve member and a thermal actuator, said thermal actuator operating to move said valve member from a fully closed position at a first temperature to a fully open position at a second temperature said thermal actuator further operating to move said valve member to a partially closed position at a temperature intermediate said first and second temperatures, wherein said valve is capable of moving from said partially closed position to said fully closed position in response to temperature without moving to said fully open position.

2. An inflatable aircraft evacuation slide system comprising:
    an inflatable evacuation slide stored in an undeployed condition;
    a source of inflation gas for inflating said inflatable evacuation slide;
    a control valve, said control valve comprising;
        a valve body defining an interior chamber and an inlet port in fluid communication with said source of inflation gas,
        a primary valve member, said primary valve member disposed in a gas flow path between said inlet port and said interior chamber, said primary valve member opening in response to an external signal to permit pressurized fluid to flow from said inlet port into said interior chamber,
        a primary outlet port having a first end opening into said interior chamber and a second end in fluid communication with said inflatable evacuation slide defining a gas flow path from said interior chamber to said inflatable evacuation slide, and
        a gas relief valve in fluid communication with said a gas flow path between said interior chamber of said control valve and said inflatable evacuation slide, said gas relief valve having a vent port opening into a region external to said valve body, said gas relief valve further comprising a valve member and a thermal actuator, said thermal actuator operating to move said valve member to obstruct said vent port with decreasing temperature and to move said valve member to open said vent port with increasing temperature, wherein:
    said thermal actuator operates to move said valve member a distance that is proportional to temperature.

3. The inflatable aircraft evacuation slide system of claim 2, wherein:
    said thermal actuator operates to move said valve member from 0.0001 to 0.001 inches per degree Fahrenheit.

4. The inflatable aircraft evacuation slide system of claim 3, wherein:
    said thermal actuator operates to move said valve member from 0.0006 to 0.0008 inches per degree Fahrenheit.

5. The inflatable aircraft evacuation slide system of claim 1, wherein:
    said thermal actuator comprises a housing, an expanding element and a piston, said housing having a bore adapted to contain said expanding element, said piston having a first end disposed in and slidingly engaging said bore and a second end engaging said valve member, wherein said expanding element expands.

6. The inflatable aircraft evacuation slide system of claim 1, wherein:
    said vent port has a flow area of zero square inches at −65 degrees Fahrenheit and a flow area of 0.3 square inches at +160 degrees Fahrenheit.

* * * * *